United States Patent [19]

Ishii et al.

[11] Patent Number: 5,084,849
[45] Date of Patent: Jan. 28, 1992

[54] METHOD FOR SETTING THE LOOP GAIN OF SERVO LOOPS IN A DISC PLAYER

[75] Inventors: Hidehiro Ishii; Noriyoshi Takeya; Chiharu Miura; Tatsuya Fukuda, all of Tokorazawa, Japan

[73] Assignee: Pioneer Electronic Corporation, Tokyo, Japan

[21] Appl. No.: 433,685

[22] Filed: Nov. 8, 1989

[30] Foreign Application Priority Data

Mar. 20, 1989 [JP] Japan .................................. 1-69022

[51] Int. Cl.$^5$ .............................................. G11B 7/00
[52] U.S. Cl. ................................ 369/44.35; 369/44.34
[58] Field of Search ............... 369/44.25, 44.29, 44.31, 369/44.34, 44.35, 44.36, 44.27

[56] References Cited

U.S. PATENT DOCUMENTS 4,707,648 11/1987 Minami ........................... 369/44.34
4,787,076 11/1988 Deguchi et al. ................. 369/44.37
5,003,521 3/1991 Yoshida et al. .................. 369/44.37

Primary Examiner—Donald McElheny, Jr.
Attorney, Agent, or Firm—Perman & Green

[57] ABSTRACT

A loop gain setting method automatically sets the loop gain of a focus servo loop and a tracking servo loop of a disc player for playing a disc. Firstly the loop gains of the focus servo loop and the tracking servo loop are set, and subsequently the appropriateness of the set values of loop gains is judged by comparing the set values of the loop gains with each other. According to another aspect of the present invention the loop gains of the focus servo loop and the tracking servo loop are set, and subsequently the appropriateness of the set values of loop gains is judged by comparing at least one of the set values of the loop gains with a sensed value of the amplitude of the envelope of an RF signal read-out from the disc.

6 Claims, 8 Drawing Sheets

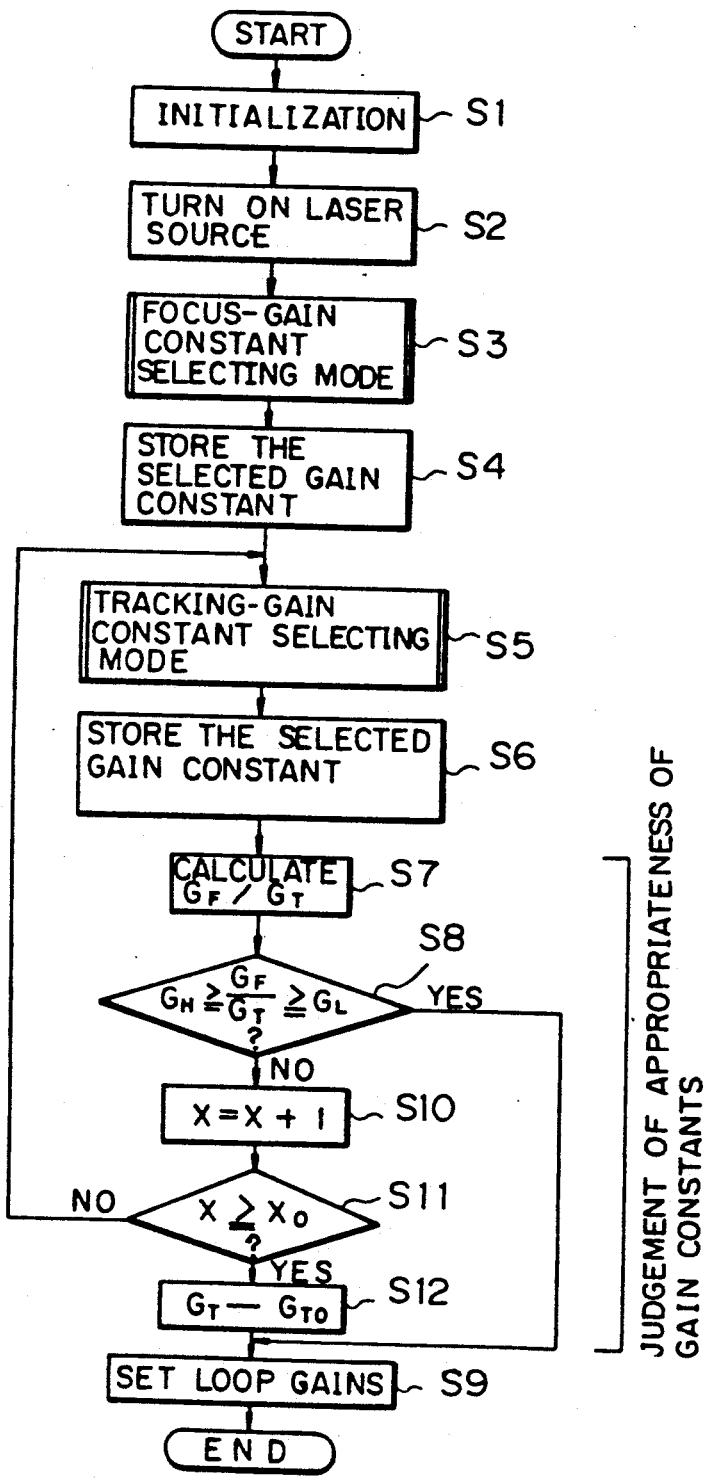

METHOD FOR SETTING THE LOOP GAIN OF SERVO LOOPS IN A DISC PLAYER

BACKGROUND OF THE INVENTION

1. Field of the Invention

The present invention relates to a loop gain setting method for for automatically setting the loop gain of the focus servo loop and tracking servo loop of a disc player.

2. Description of Background Information

In optical disc players for playing an information recording disc (simply referred to as disc hereinafter) such as a video disc or a digital audio disc, it is necessary to use a focus servo system for converging the light beam onto the surface of the disc to form a light spot for reading information and a tracking servo system for moving the information reading point so that it follows the recording track accurately.

As the focus servo system, systems according to a so-called astigmatic method are known, which systems are arranged such that the light beam is converged, by using a cylindrical lens for example, as a focal line in horizontal direction at one of two points on the light path of the light beam which are apart from each other, and also converged as a focal line in vertical direction at the other of the two points, a light sensor of a quadrant type is disposed at a middle position of the two points to generate an error signal, and a focus error signal is generated from four output signals of the quadrant type light sensor As the tracking servo system, systems according to a so-called three-beam method is known, which systems are arranged such that three beams including a main beam for reading information and two sub-beams for detecting tracking errors disposed on both sides of the main beam are prepared and arranged so that a line passing centers of the three beams forms a predetermined off-set angle with respect to the direction of the track, and an error signal is generated from a difference between the amount of the two sub-beams reflected by the recording surface of the disc.

In these servo systems, the loop gain of each servo system can be varied for each disc to be played, as a result of a variation in the reflectivity of discs, a variation of optical power of the pickup due to dirt or dust adhered to the pickup in association with its time change, or a variation in the sensitivity of the light detector of the pickup. This variation in the loop gain will adversely affect the operation of the servo loop to follow the focus error or the tracking error, so that the stability of the servo loop is reduced.

OBJECT AND SUMMARY OF THE INVENTION

The object of the present invention is to provide a method of setting the gain of a servo loop for disc players, by which an optimum value of a loop gain is automatically set at the time when a disc is played.

A loop gain setting method according to the present invention is configured that loop gains of the focus servo loop and the tracking servo loop are set, and subsequently the appropriateness of the set values of loop gains is judged by comparing the set values of the loop gains with each other.

According to another aspect of the present invention a loop gain setting method is configured that loop gains of the focus servo loop and the tracking servo loop are set, and subsequently the appropriateness of the set values of loop gains is judged by comparing at least one of the set values of the loop gains with a sensed value of the amplitude of the envelope of the RF signal read-out from the disc.

BRIEF DESCRIPTION OF THE DRAWINGS

FIG. 4 is a flowchart showing the procedure of an embodiment of the loop gain setting method according to the present invention;

DETAILED DESCRIPTION OF PREFERRED EMBODIMENTS

Figure 1:
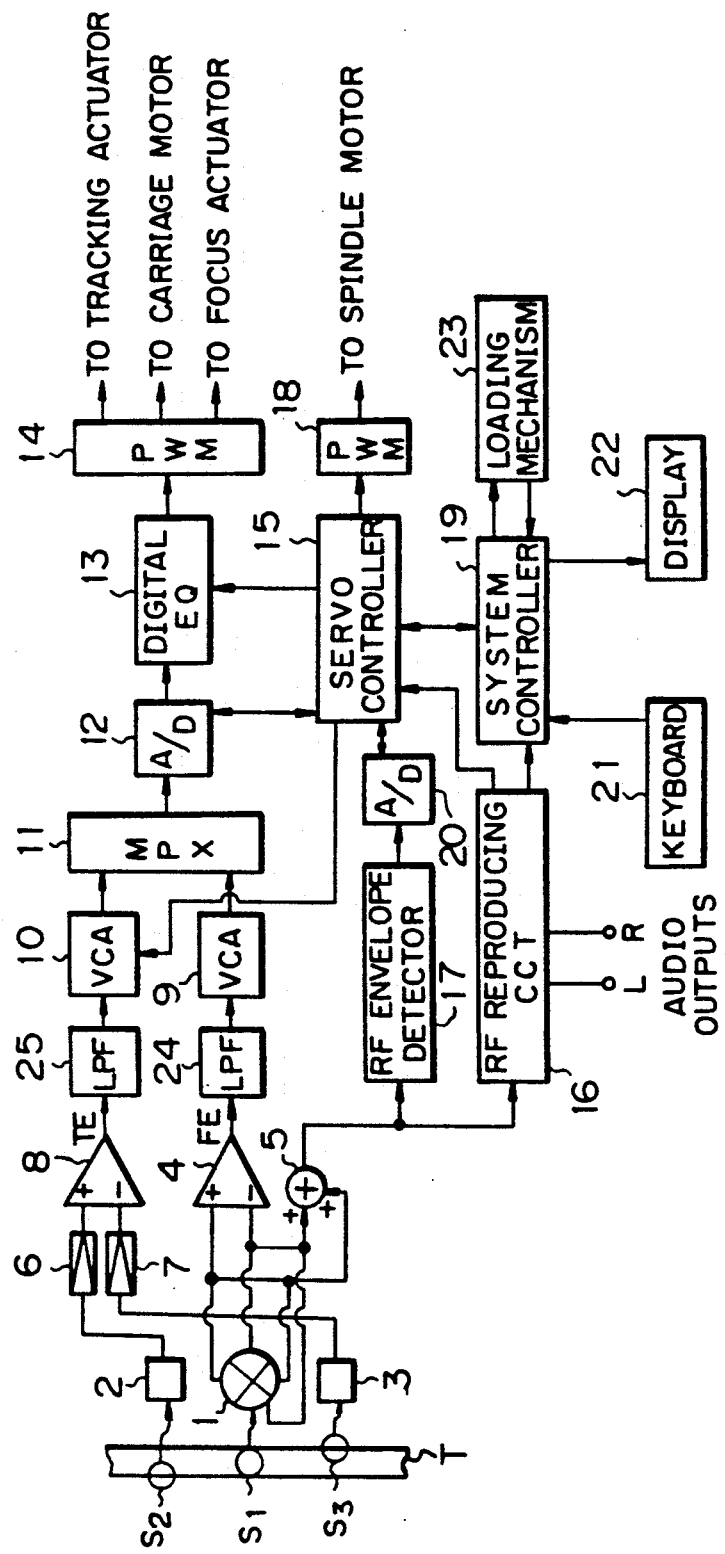
FIG. 1 is a block diagram showing the structure of an example of signal processing system of a disc player, in which the loop gain setting method according to the present invention is to be adopted.
Figure 2:
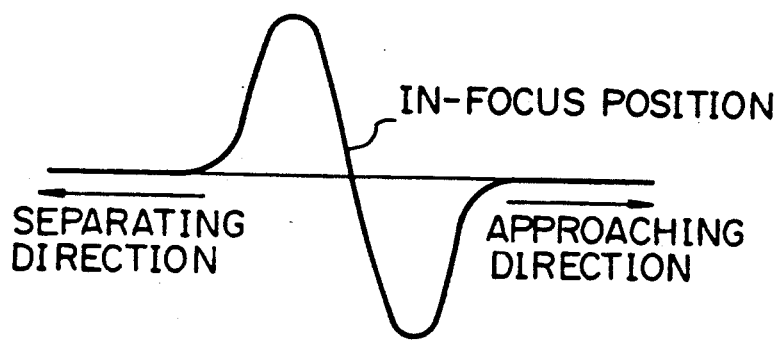
FIG. 2 is a waveform diagram showing the change in the level of a focus error signal with respect to the distance between the objective lens and the disc surface.

FIG. 1 is a block diagram of a signal processing system of a disc player in which the loop gain setting method according to the present invention is applied. In the FIG. 1, three beam spots obtained by converging a laser beam, that is, a recorded information reading spot S1, and a pair of spots S2 and S3 for detecting tracking information which precede or follow the spot S1 are irradiated from a pickup (not illustrated) on a recording track T of a disc in a positional relationship as illustrated. Reflection lights of these beam spots are received by photo-electric transducers 1 through 3 which are incorporated in the pickup, where the received lights are converted to electric signals. Furthermore, the pickup incorporates therein an optical system including an objective lens, a focus actuator for positioning the objective lens in a direction of optical axis with respect to the information recording surface of the disc, and a tracking actuator for positioning the beam spots in a direction of disc radius with respect to the recording track T. This pickup is mounted on a carriage (not shown) which is disposed to be movable along the direction of disc radius The photo-electric transducer 1 is made up of four light receiving elements which are arranged to be bounded by two lines crossing at right angles with each other, and independent from each other. Each sum of output signals of two light receiving elements facing with each other about the center of the light receiving surface is supplied to a differential amplifier 4 in which a difference between two sum is derived. The differential signal constitutes a focus error (FE) signal. As shown in FIG. 2, this focus error signal shows the so called S curve characteristic having a zero-crossing point at an on-focus position in a range of the distance between the objective lens and the surface of the disc, as the objective lens moves up and down from the on-focus position. Furthermore, the above-mentioned sums of the output signals of the light receiving elements are supplied to an adder 5 in which a sum total of the output signals of each elements is derived. The sum total will be treated as a read-out RF signal.

Figure 3A:
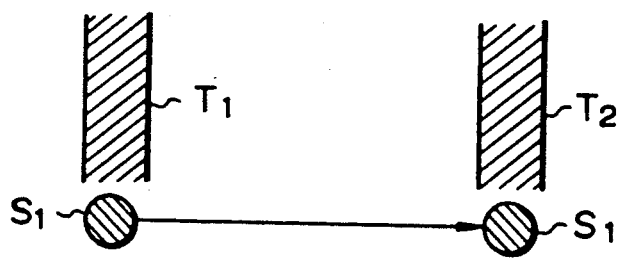
FIG. 3A is a diagram showing the relationship between the moved distance of the information reading spot from a recording track.
Figure 3B:
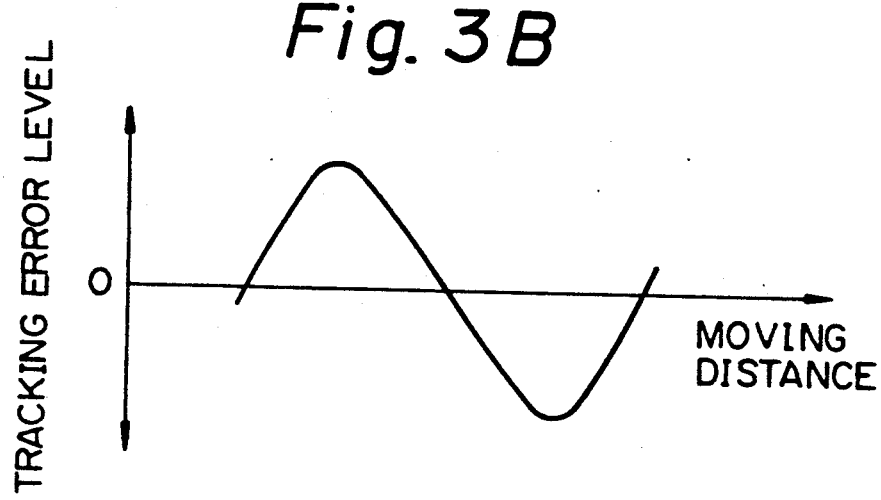
FIG. 3B is a diagram showing a tracking error signal as the information reading spot deviates from positions over adjacent recording tracks.

The output signals of the photo-electric transducers 2 and 3 are supplied to a differential amplifier 8 through amplifiers 6 and 7 respectively, in which a differential signal between them is derived. This differential signal will be treated as the tracking error signal (TE). If the beam spot S1 moves from one track T1 to the adjacent track T2 as illustrated in FIG. 3A while the tracking servo loop is open, the tracking error signal varies in the form of a sine wave as shown in FIG. 3B. The level of the tracking error signal is proportional to the amount of the deviation of the beam spot S1 from the recording track T in the vicinity thereof, and the zero-crossing point of the tracking error signal corresponds to the center of the recording track T and also the middle position between two adjacent recording tracks.

The focus error signal and the tracking error signal are supplied to an MPX (multiplexer) 11 through LPF (low-pass filter) circuits 24 and 25 for attenuating unnecessary frequency components above the sampling frequency of the A/D conversion, and VCAs (voltage-controlled amplifiers) 9 and 10. The MPX 11 is configured to transmit the focus error signal and the tracking error signal to an A/D converter 12 of the next stage after effecting a time division multiplexing operation.

The error signals digitized in the A/D converter 12 are supplied to a PWM (pulse width modulation) circuit 14 after passing through a digital equalizer (EQ) 13 in which the frequency characteristic of the error signal is compensated. In the PWM circuit 14, drive signals respectively having a pulse width corresponding to the magnitude (level) of the error signal are generated and supplied to the focus actuator and the tracking actuator which have been mentioned before. The PWM circuit 14 also produces a drive signal having a pulse width corresponding to the level of a low-frequency component extracted from the tracking error signal and compensated in frequency characteristic in the digital EQ 13. This drive signal is supplied to a carriage motor (not shown), that is, the power source for driving the carriage on which the pickup is mounted.

The above-described circuit elements as a whole form a digital servo system for analog-to-digital conversion and for digitally processing each error signal. The operation of this digital servo system is controlled by a servo controller 15 consisting of a microcomputer. The servo controller 15 performs such operations as the on-off control of each servo loop, the generation of the drive signal for moving up/down the objective lens, the gain control of the VCAs 9 and 10, and the control of the equalizing characteristic of the digital EQ 13.

The read-out RF signal, that is, the output signal of the adder circuit 5 is supplied to an RF reproducing circuit 16 and an RF envelop detector 17. If the disc to be played is a compact disc, the read-out RF signal is an EFM (eight-to-fourteen modulation) signal, the EFM signal is demodulated by an EFM demodulation operation in the RF reproducing circuit 16, and an error correction operation is performed thereto. Subsequently, the signal is converted to the left and right audio signals through a D/A (digital-to-analog) conversion process. The RF reproducing circuit 16 also produces a phase error signal corresponding to the phase error of a playback clock signal extracted from the read-out RF signal with respect to a reference clock signal. Furthermore subcode information is decoded from the EFM demodulation data in the RF reproducing circuit 16. The phase error signal is supplied to the PWM circuit 18 through the servo controller 15, and a drive signal having a pulse width corresponding to the level of the error signal is supplied from the PWM circuit 18 to a spindle motor (not shown) for rotating the disc. The subcode information is supplied to the system controller 19. An RF envelope detected in the RF envelope detector 17 is digitized in an A/D converter 20, and supplied to the servo controller 15.

The system controller 19 consists of a microcomputer, and executes the operations of controlling the whole system in response to operation commands supplied from the key board 21, or the subcode information supplied from the RF reproduction circuit 16. The system controller 19 further performs operations for controlling the display through a display device 22, and for driving a loading mechanism 23 for loading or unloading the disc.

The operational steps according to the first embodiment of the loop gain setting method of the present invention, which is executed by the processor of the system controller 19 will be explained with reference to the flowchart of FIG. 4. It is assumed that this loop gain setting process is started at the time when the loading and the clamp of the disc are completed, and the arrival of the carriage carrying the pickup to the innermost position is detected.

When the arrival of the carriage to the innermost position is detected by a detection means (not shown), the processor executes an initializing operation for resetting data stored in an internal memory such as the RAM, and count values of various counters (step S1). Then, the processor turns on the laser source of the pickup (step S2). Subsequently, the processor executes operations of a focus-gain constant selecting mode for selecting a gain constant $G_F$ for setting the loop gain of the focus servo loop on the basis of a p—p (peak to peak) value for example, representing the magnitude of the amplitude of the focus error signal (step S3). The processor stores the gain constant selected in this mode in the internal memory as a selected focus-gain constant (step S4). The operations of the focus-gain constant selecting mode will be described later. After selecting the focus-gain constant $G_F$, the processor executes operations of a tracking-gain constant selecting mode for selecting a gain constant $G_T$ for setting the loop gain of the tracking servo loop on the basis of a p—p value for example, representing the magnitude of the amplitude of the tracking error signal (step S5). The processor stores the gain constant selected in this mode in the internal memory as a selected tracking-gain constant (step S6). The operations of the tracking-gain constant selecting mode will be described later.

After selecting the focus and tracking-gain constants $G_F$ and $G_T$, the processor judges the appropriateness of the selected gain constants $G_F$ and $G_T$ before setting the loop gains by using the selected gain constants $G_F$ and $G_T$. The judgement of the appropriateness of the selected gain constants $G_F$ and $G_T$ is executed in view of the fact that there is a correlation between the magnitude of the obtained focus and tracking error signals so far as the error signals are obtained from the same disc. Theoretically, it is premised that constant values, for example substantially the same values, are used for playing the same disc, as the focus and tracking-gain constants. The operations will be described below. It is empirically known that the frequency distribution of the tracking error signal is raised by the eccentricity of disc, and the magnitude of its amplitude is affected after passing through the LPF 25, so that the selected tracking-gain constant $G_T$ has a lower reliability than the selected focus-gain constant $G_F$. Therefore, in this embodiment, the appropriateness of the tracking-gain constant is judged with reference to the focus-gain constant $G_F$.

After selecting the focus-gain constant $G_F$ and tracking-gain constant $G_T$, and the processor executes a calculation of a ratio $G_F/G_T$ using the selected gain constants $G_F$ and $G_T$ (step S7). Then the processor judges in step S8 whether or not the ratio $G_F/G_T$ is within a predetermined range ($G_H \geq G_F/G_T \geq G_L$). Since substantially the same values are selected as the gain constants $G_F$ and $G_T$ as described before, the ratio $G_F/G_T$ is almost equal to 1. Therefore, the above-mentioned predetermined range is, for example, set between 0.7 and 1.3 ($G_H = 1.3$, $G_L = 0.7$). If $G_H \geq G_F/G_T \geq G_L$, the processor judges that the selected gain constants $G_F$ and $G_T$ have appropriate values, and sets the gain of VCAs 9 and 10 so that the loop gains corresponding to the gain constants $G_F$ and $G_T$ are attained (step S9).

If it is determined in step S8 that the ratio $G_F/G_T$ is outside the predetermined range ($G_F/G_T > G_H$ or $G_L > G_F/G_T$), it is then assumed that the value of tracking-gain constant $G_T$ is anomalous, because of the reason mentioned before although there is a possibility that the selected focus-gain constant is anomalous. Then the processor increments the count value X of a counter for counting the number of judgment of the anomalous value (step S10). The processor further judges in step S11 whether or not the count value X is greater than a predetermined value $X_0$ (for example, 2). If $X < X_0$, the processor returns to step S5 for selecting the tracking-gain constant $G_T$ once more. If $X \geq X_0$, it means that the value of the selected tracking-gain constant $G_T$ has been determined to be anomalous more than twice, an initial set value $G_{T0}$ is set as the tracking-gain constant $G_T$ (step S12). Subsequently, the processor proceeds to step S9, to set each loop gain. After the operations described above, a sequential procedure for setting the loop gains of the focus and tracking servo loops will be terminated.

As specifically explained above, the selected focus and tracking-gain constants $G_F$ and $G_T$ are compared with each other, and the tracking-gain constant $G_T$ is reselected or the initial set value is used as the tracking-gain constant $G_T$ if a result of the comparison is that the selected gain constants are different from each other. Therefore, even if the magnitude of the amplitude of the tracking error signal is varied by the influence of the eccentricity of the disc etc., the tracking-gain constant $G_T$ will be re-selected or the initial set value will be used as the tracking-gain constant. Thus, adverse effects of the eccentricity of the disc etc. are eliminated so that optimum values are set as the loop gains respectively for each disc being played.

In the embodiment described above, the selected focus-gain constant $G_F$ and tracking-gain constant $G_T$ are compared and only the tracking-gain constant $G_T$ is reselected if the result of the comparison indicates that the selected gain constants are different from each other. It is, however, also possible to arrange the system to re-select both of the focus and tracking-gain constants $G_F$ and $G_T$. Furthermore, if the selected tracking-gain constant $G_T$ has a higher reliability than the selected focus-gain constant $G_F$, it is possible to arrange the system such that only the focus-gain constant $G_F$ is re-selected.

Figure 5:
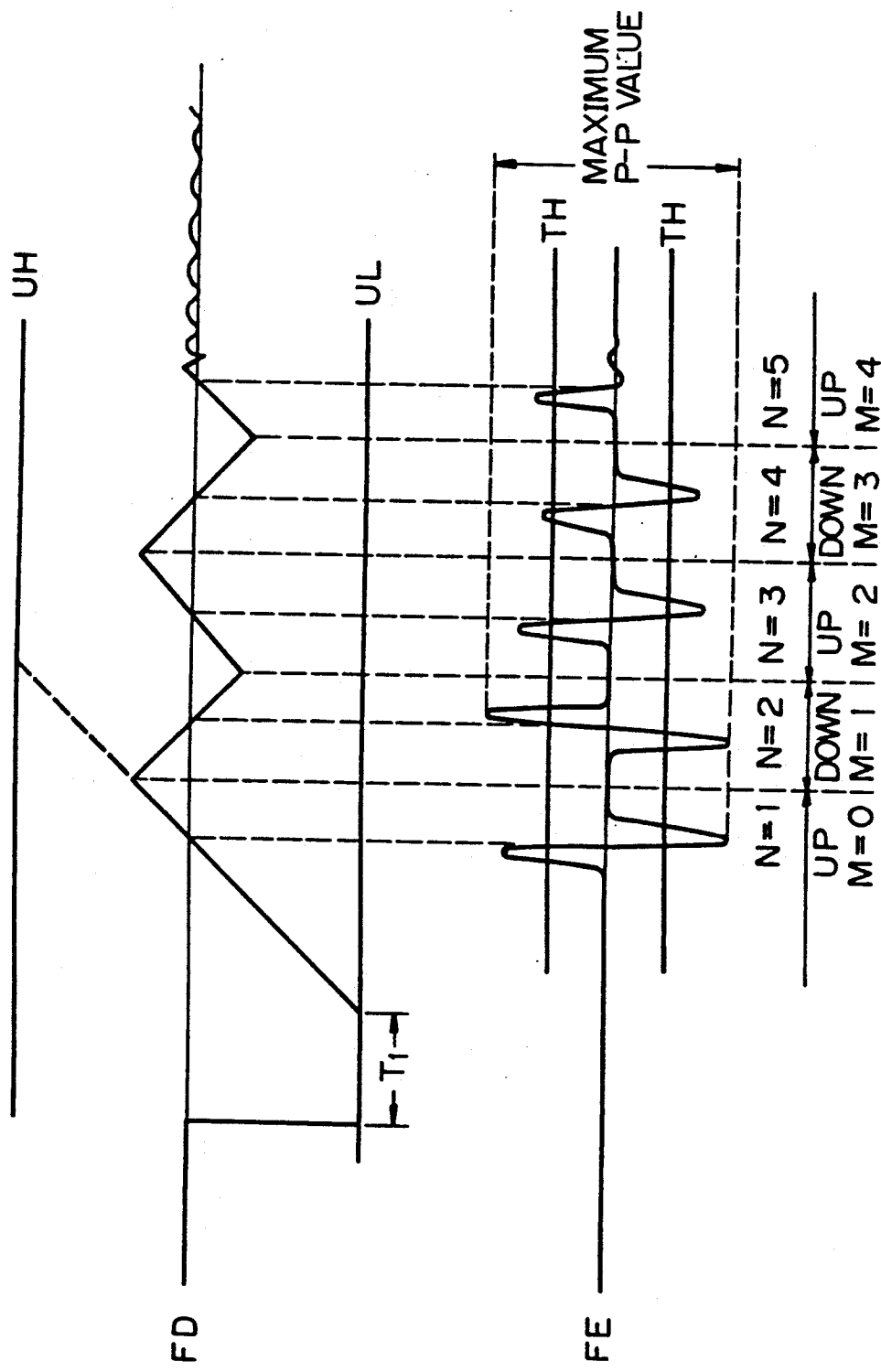
FIG. 5 is a timing chart showing the timings in the procedure of focus-gain constant selecting mode.
Figure 6A:
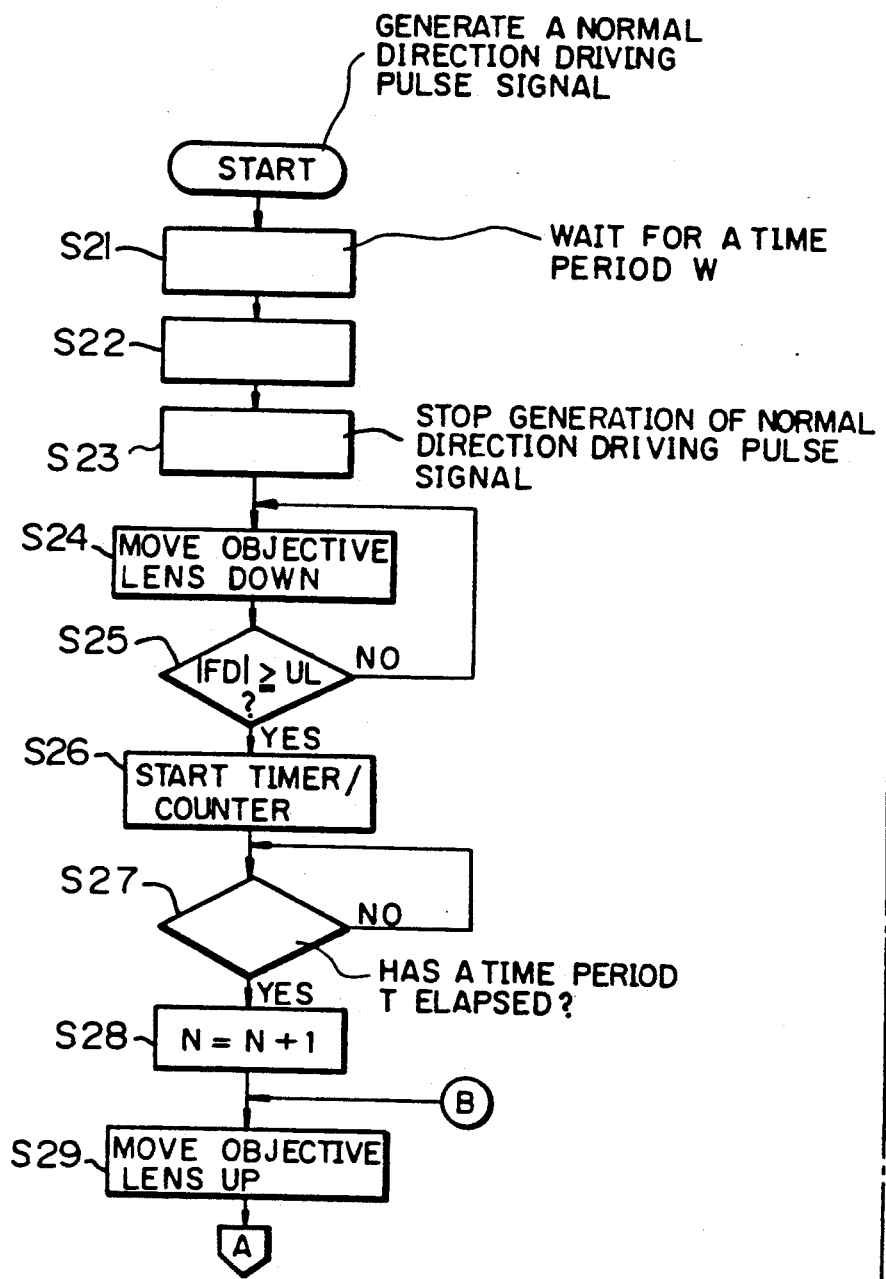
FIG. 6A-6B are a flowchart showing the procedure in the focus-gain constant selecting mode.
Figure 6B:
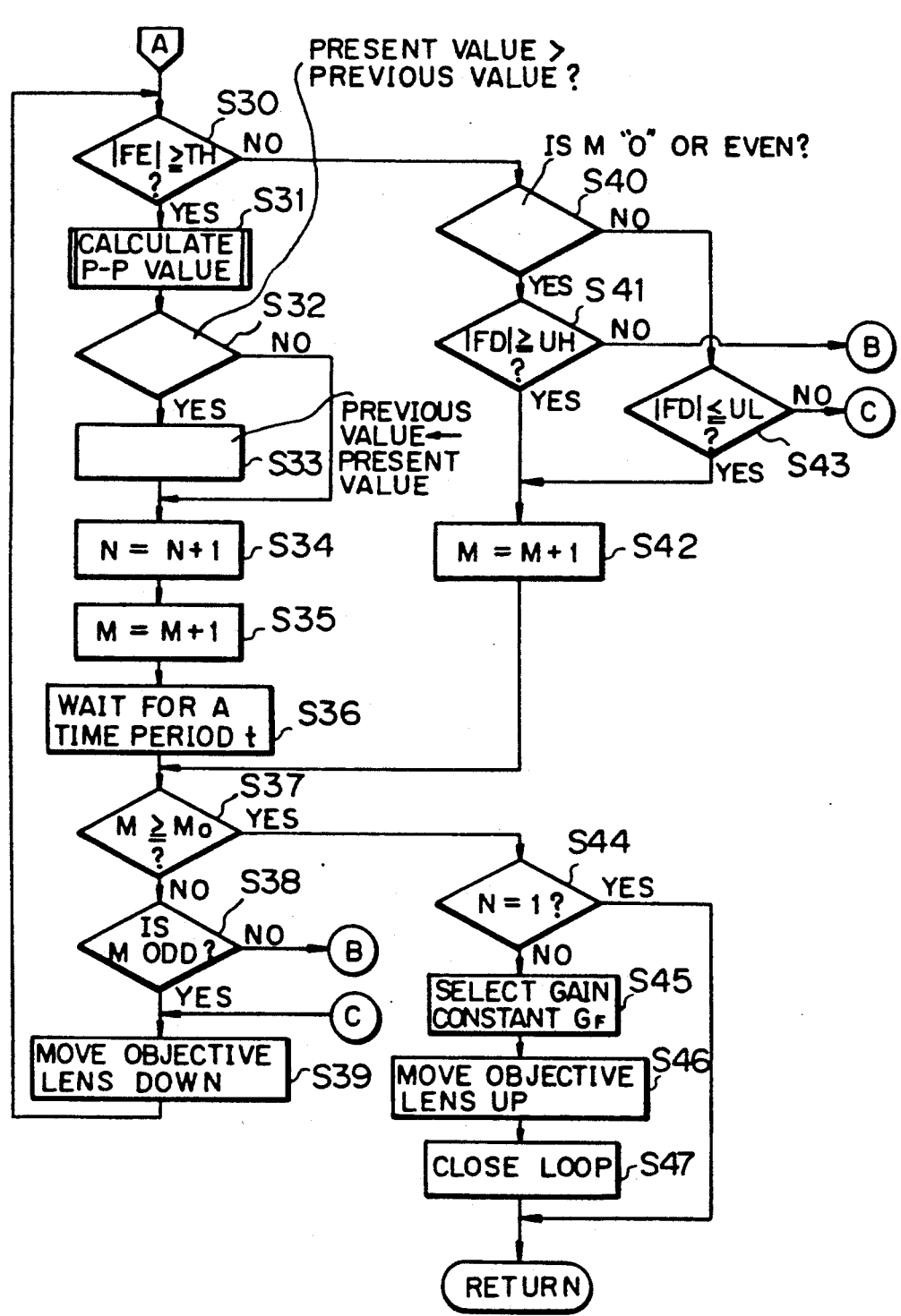

Referring to the flowchart of FIG. 6, an example of the procedure in the focus gain selecting mode will be explained hereinafter, with reference also to the timing chart of FIG. 5. It is assumed that this procedure is performed while the servo loops are opened.

Firstly, in order to drive the spindle motor in the normal direction, the processor executes the control of the servo controller 15, to activate the PWM circuit 18 so that it generates a normal-direction driving pulse signal having a wave-height value H, as a kick pulse (step S21). After the elapse of a predetermined time period W (100 millisecond, for example) which is detected in step S22, the processor makes the servo controller 15 to stop the generation of the normal-direction driving pulse (step S23). The speed of rotation of the spindle motor is determined by the pulse width and the pulse height of the normal-direction driving pulse signal, and the pulse width W and the pulse height H are determined so that the spindle motor rotates during a short period and at a slow speed which is much lower than the constant speed during the play operation.

Then, in order to move the objective lens downwards, the processor executes the control of the servo controller 15 so that it generates a negative driving voltage (FD) (step S24). The objective lens is driven downwards until the absolute value of the driving voltage $|FD|$ becomes higher than a lower limit value (UL) of the focus driving voltage (step S25). When $|FD| \geq UL$ is satisfied, the timer-counter is activated to start counting (step S26). The counting operation of the timer-counter is performed in synchronism with the internal reference clock. By using the count value of the timer-counter, whether a predetermined time period T is elapsed from the time when $|FD| \geq UL$ was attained is detected (step S27), and the count value N of the internal counter I is incremented upon detection of the elapse of the predetermined time period T (step S28). At the same time, in order to raise the objective lens, the servo controller 15 is controlled to generate a ramp-form signal (FD) whose level increases gradually (step S29). The count value N represents the number of times in which the p—p value of the S-curve is retrieved.

Then the processor retrieves the error data obtained as the output signal of the A/D converter 12, and judges whether or not the absolute value of the error data $|FE|$ has risen to be higher than a threshold level $T_H$ (step S30). If $|FE| \geq TH$, it is judged that the focus-error rather than the noise is present, and the processor calculates the p—p value, that is, the difference between the positive and negative wave heights by using the retrieved error data (step S31). This is because the focus error signal has an S-curve characteristic near the in-focus position of the objective lens. The calculation of the p—p value of the S-curve is performed, for example, as follows. At first, the present value and the previous value of the error data are compared, which error data is retrieved at every sampling timing of the A/D conversion. For positive wave-height values, a previous value when the present value is lower than the previous value is used as each wave-height value. Conversely, for negative wave-height values, a previous value when the present value is higher then the previous value is used as each wave-height value. The p—p value is derived as the difference between the positive and negative wave-height values obtained as described above.

Then the present value of the p—p value obtained as described above is compared with the previous value of the p—p value (step S32), and the present value is stored in memory as a new "previous value" when the present value is greater than the previous value (step S33). If the present value is equal to or smaller than the previous value, the previous value is maintained as it is. Through the above-described procedure, the maximum value among the p—p values which have been retrieved is stored in memory. Subsequently, the count value N of the internal counter I and the count value M of the internal counter II ar incremented respectively (steps S34 and S35). The count value M represents the number of times in which the objective lens is moved up/down. Then, after the elapse of a predetermined time period t (5 millisecond, for example) which is detected in step S36, the processor judges whether or not the count value M of the internal counter II is higher than a predetermined value $M_0$ (4, for example), that is, whether or not the up/down movement of the objective lens has occurred more than $M_0$ times (step S37).

If $M < M_0$, the processor then judges whether or not M is an odd number (step S38). If M is equal to zero or an even number, the processor returns to step S29, to turn-over the lens driving direction, and repeats the operations described above. If M is an odd number, the processor turns over the lens driving direction, and in order to move the objective lens downwards, executes the control of the servo controller 15, to generate a driving voltage (FD) of a ramp form whose level decreases gradually (step S39). Then the processor returns to step S30, to repeat the process described above.

If it is judged in step S30 that $|FE| < TH$, then the processor judges whether or not the count value M of the internal counter II is equal to zero or an even number (step S40). If it is judged that M is equal to zero or an even number, the processor then judges whether or not the driving voltage FD has exceeded an upper limit value UH thereof (step S41). If $FD \geq UH$, the processor increments the count value M of the internal counter II (step S42), and proceeds to step S37 subsequently. If $FD > UH$, the processor returns to step S29, to repeat the above-described procedure. If it is judged in step S40 that M is an odd number, the processor then judges whether or not the driving voltage FD has reduced lower than its lower limit value UL (step S43). If $|FD| \leq UL$, the processor proceeds to step S42, and it proceeds to step S39 if $|FD| > UL$.

If it is judged in step S37 that $M \geq M_0$, the processor judges whether or not the count value N of the internal counter I is equal to "1" (step S44). If $N = 1$, it means that the p—p value of the S-curve to be used as a reference for setting the loop gain has not been retrieved even once through the $M_0$ times of up/down movement of the objective lens, and the above-described sequential process will be terminated without setting the loop gain. In this case, the process is repeated once more. If $N \neq 1$, the loop gain constant $G_F$ of the focus servo loop is selected (step S45) by using the maximum value of the p—p value finally stored in memory in step S33. Subsequently, in order to move the objective lens upwards, the processor executes the control of the servo controller 15, so that it generates the driving voltage (FD) of the ramp-form whose level increases gradually (step S46). Then, the processor puts the servo loop in the closed state (step S47). By this operation, the sequential procedure for setting the loop gain $G_F$ is terminated.

It will be understood that the explanation of the above procedure in the focus gain constant selecting mode has been made for the illustrative purpose only, and various changes may be made without departing from the gist of the present invention.

Figure 8:
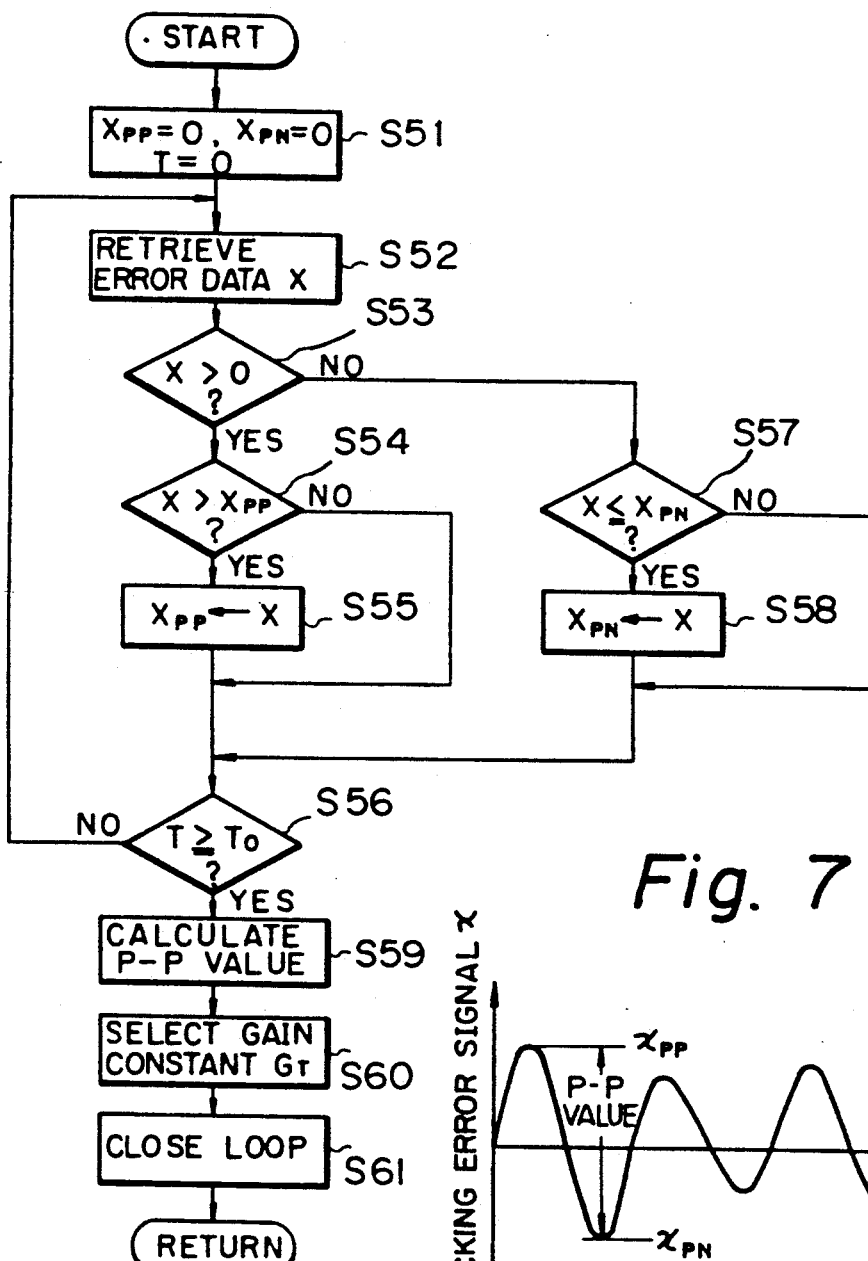
FIG. 8 is a flowchart showing the procedure in the tracking-gain constant selecting mode.
Figure 7:
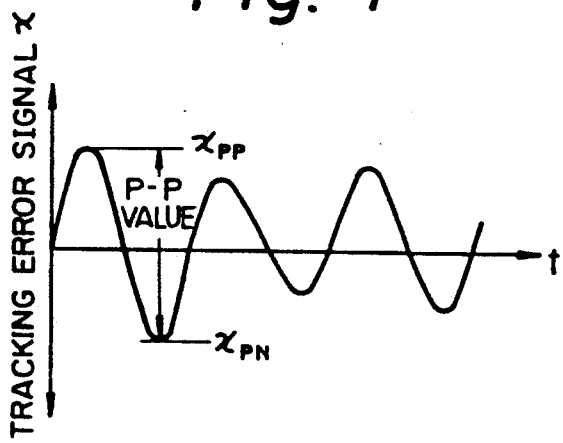
FIG. 7 is a waveform diagram showing the waveform of a tracking error signal obtained while the tracking servo loop is opened.

An example of procedure in the tracking-gain constant selecting mode described before will be explained with reference to the flowchart of FIG. 8. It is assumed that the procedure to be described is executed upon starting of the operation of the spindle servo system, after the speed of rotation of the disc has reached a predetermined speed (in the case of CDs, about 100 r.p.m., for example) while the servo loop is open. When the servo loop is open, the tracking error signal varies as shown in FIG. 7.

Firstly, the processor executes an initial setting process, by which detection peak values $X_{PP}$ and $X_{PN}$ to be stored in the internal register, and the count value T of the counter which counts up in synchronism with the sampling timing of the A/D converter are reset (step S51). Subsequently, the processor retrieves tracking error data x (step S52). The retrieval of the tracking error data x is executed in synchronism with the sampling timing described above.

Subsequently, the processor judges whether or not the error data x is positive (step S53). If $x > 0$, the processor judges whether or not the error data x is greater than the detected peak value xpp up to the previous time (step S54). If $x > xpp$, the error data x retrieved this time is stored as the new value of the detected peak value xpp (step S55). Subsequently, the processor proceeds to step S56. If $x \leq xpp$, the processor directly proceeds to step S55. In step S55, a time period $T_0$ for retrieving the error data x is controlled by using the count value T of the timer-counter. The time period $T_0$ is selected, for example, to start from the time when the speed of rotation of the disc has reached the predetermined speed upon starting of the operation of the spindle servo, and to end upon the lapse of a time period required for at least one revolution of the disc subsequently. If the time period $T_0$ for the retrieval has not elapsed, the processor returns to step S52, to repeat the process described above.

If it is judged in step S53 that $x \leq 0$, the processor then judges whether or not the error data x is equal to or smaller than the detected peak value $x_{PN}$ up to the previous time (step S57). If $x \leq x_{PN}$, the processor stores the error data x retrieved this time, as the detected peak value $x_{PN}$ (step S58). Subsequently, the processor proceeds to step S56. If $x > x_{PN}$, the processor directly proceeds to step S56. If it is judged in step S56 that the time period $T_0$ for retrieving the error data has elapsed, the detected peak values $x_{PP}$ and $x_{PN}$ at that time are to be used positive and negative maximum peak values $P_P$ and $P_N$. Therefore, the processor calculates the p—p value by using the peak values $P_P$ and $P_N$ (step S59). Then the processor selects the gain constant $G_T$ corresponding to the calculated p—p value (step S60), and puts the servo loop in the open state (step S61). By this operation, the sequential procedure for setting the loop gain $G_T$ is terminated.

It will be understood that the explanation of the above procedure in the tracking gain constant selecting mode has been made for the illustrative purpose only, and various changes may be made without departing from the gist of the present invention. For example, the tracking error data can be gathered by rotating the disc at a low speed of about 100 r.p.m., and moving the information reading spot radially with respect to the disc, so that the tracking error data obtained under such a condition are retrieved as sampling values.

Figure 9:
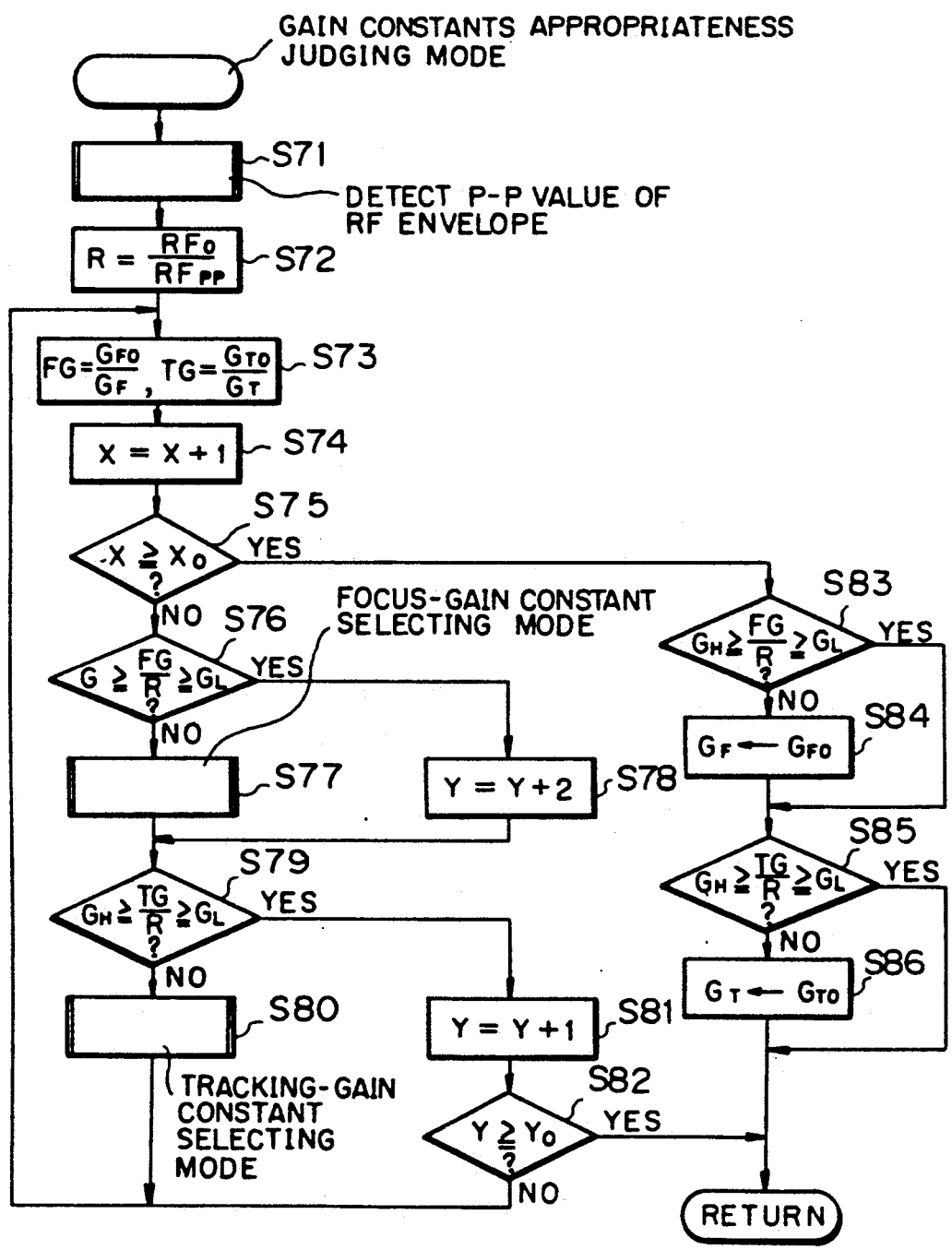
FIG. 9 is a flowchart showing the procedure in another embodiment of the loop gain setting method according to the present invention.

FIG. 9 is a flowchart showing another embodiment of the loop gain setting method according to the present invention which is executed by the processor of the system controller 19. This flowchart corresponds to steps (steps S7 through S12) of the process for determining the appropriateness of the gain constants in the previous embodiment shown in the flowchart of FIG. 4.

At first, the processor retrieves the RF envelope data from the A/D converter 20, and calculates the p—p value of the RF envelope (step S71). The calculation of the p—p value of the RF envelope is executed, for example, as follows. At first, the present value and the previous value of the error data are compared, which error data is retrieved at every sampling timing of the A/D conversion. For positive wave-height values, a previous value when the present value is lower than the previous value is used as each wave-height value. Conversely, for negative wave-height values, a previous value when the present value is higher then the previous value is used as each wave-height value. The p—p value is derived as the difference between the positive and negative wave-height values obtained as described above. Then, the processor calculates a criterion constant R given by a formula $RF_0/RF_{PP}$, using the calculated p—p value $RF_{PP}$ of the RF envelope and its reference value $RF_0$ (step S72).

Subsequently, the processor calculates decision constants FG and TG of the focus-gain constant $G_F$ and the tracking-gain constant $G_T$, according to formulas $G_{F0}/G_F$ and $G_{T0}/G_T$, using the focus and tracking-gain constants $G_F$ and $G_T$ which have been determined in steps S3 and S5 in FIG. 4, and reference gain constants $G_{F0}$ and $G_{T0}$ which have been set on the basis of the reference level $R_{F0}$ of the RF envelope (step S73). Then, the processor increments a count value X of a counter for counting the occurrence of the anomalousness (step S74). Subsequently the processor judges, in step S75, whether or not the count value X is larger than a predetermined value $X_0$ ($X_0=3$, for example).

If $X<X_0$, the processor judges, in step S76, whether or not the ratio (FG/R) between the focus-decision constant FG and the criterion constant is within a predetermined range ($G_H \geq F_G/R \geq G_L$). If it is judged that $F_G/R$ is outside the range ($F_G/R>G_H$ or $G_L>F_G/R$), it can be regarded that the value of the focus-gain constant $G_F$ which has been selected in step S3 of FIG. 4 is anomalous, and the processor re-selects the focus-gain constant $G_F$ (step S77). The operation in this step S77 is the same as that in step S3 in FIG. 4. If $G_H \geq F_G/R \geq G_L$, the processor increments a count value Y of a counter for counting the occurrence of the normal judgment, by a value of two (step S78).

Then, the processor judges, in step S79, whether or not the ratio $T_G/R$ between the tracking-decision constant $T_G$ and the criterion constant R is within the predetermined range ($G_H \geq T_G/R \geq G_L$). If it is judged that the ratio $T_G/R$ is outside the predetermined range ($T_G/R>G_H$ or $G_L>T_G/R$), it can be regarded that the value of the tracking-gain constant $G_T$ which has been selected in step S5 of FIG. 4 is anomalous, and the processor re-selects the tracking-gain constant $G_T$ (step S80). Subsequently, the processor returns to the step S73, to repeat the process described above. The operation in the step S80 for re-selecting the tracking-gain constant is the same as that in step S5 in FIG. 4. If $G_H \geq T_G/R \geq G_L$, the processor increments the count value Y of the counter for counting the occurrence of the normal judgment (step S81). Then, the processor judges, in step S82, whether or not the count value Y is equal to or greater than the predetermined value $Y_0$ ($Y_0=3$, for example). If $Y \geq Y_0$, it can be regarded that both of the focus and tracking-gain constants $G_F$ and $G_T$ selected in steps S3 and S5 in FIG. 4 are normal, and the procedure of judging the appropriateness of the gain constants will be terminated without executing any further operation. If $Y<Y_0$, it can be regarded that at least one of the selected focus and tracking-gain constants is anomalous, and the processor returns to step S73, to repeat the procedure described before.

If it is judged in step S75 that $X \geq X_0$, it means that the selected focus and tracking-gain constants have been determined to be anomalous more than twice under the condition where $X_0=3$. In that event, in order to judge which of the constants is anomalous, the processor judges whether the condition $G_H \geq F_G/R \geq G_L$ is satisfied (step S83). If $F_G/R>G_H$ or $G_L>F_G/R$, it can be regarded that the focus-gain constant is anomalous, a reference gain constant $G_{F0}$ (the initial setting value) is set as a new focus gain constant $G_F$ (step S84). If $G_H \geq F_G/R \geq G_L$, or after passing through the operation of step S84, the processor judges whether or not $G_H \geq T_G/R \geq G_L$, (step S85). If $T_G/r>G_H$ or $G_L>T_G/R$, it can be regarded that the tracking-gain constant is anomalous, a reference gain constant $G_T 0$ (initial setting value) is set as a new tracking-gain constant $G_T$ (step S86). By the procedure described above, the sequential process for judging the appropriateness of the gain constants is terminated.

As specifically described in the foregoing, the focus-gain constant $G_F$ and the tracking-gain constant $G_T$ are compared with the p—p value indicative of the magnitude of the amplitude of the RF envelope. If the result of the comparison indicates that the gain constant $G_F$ or $G_T$ is different from the p—p value, the gain constant $G_F$ or $G_T$ is re-selected, or the initial setting value is used as the gain constant $G_F$ or $G_T$. In this way, the characteristic of the disc to be played is grasped by the p—p value of the RF envelope. Therefore, according to the present invention optimum values are set for the loop gains without being affected by the disc's characteristic, etc.

It will be appreciated from the foregoing, after the loop gains of the focus and tracking servo loops are once selected, the appropriateness of the set values is judged by comparing the set values of the loop gains with each other according to the feature of the present invention. Therefore, the system is prevented from setting inappropriate values for the loop gains under the influence of the characteristics of the disc. Thus according to the present invention, optimum values of the loop gains can be always set upon playing of a recording disc.

Furthermore, the appropriateness of the set values of the loop gains is judged by comparing at least one of the set values of the loop gains with the detection value of the amplitude of the RF envelope. By this procedure, the characteristic of the disc to be played can be determined from the detection value of the amplitude of the RF envelope. In this way, optimum values are set for the loop gains.

In the case of the embodiments described in the foregoing, the appropriateness of the set value of a loop gain is judged by using a ratio between the set gain and another value. However, this is not limitative, and the appropriateness of the set value can be judged by using an absolute value of the difference derived from these values.

What is claimed is:

1. A loop gain setting method for automatically setting the loop gain of a focus servo loop and a tracking servo loop of a disc player while playing a disc, the method comprising:
    (a) setting a value of loop gain of the focus servo loop;
    (b) setting a value of loop gain of the tracking servo loop; and
    (c) determining the appropriateness of the loop gain values by comparing said set loop gain values to determine if they are within a predetermined range of each other.

2. The loop gain setting method of claim 1, further comprising the step of: resetting at least one of said set values of loop gains if a result of the determination in step (c) indicates that the loop gains are outside said predetermined range of each other.

3. The loop gain setting method of claim 1, further comprising the step of: replacing at least one of said set values of loop gain by an initial setting value, if a result of the determination in step (c) indicates that said loop gains are outside said predetermined range of each other.

4. A loop gain setting method for automatically setting the loop gain of a focus servo loop and a tracking servo loop of a disc player while playing a disc, the method comprising:
    (a) setting a loop gain value of the focus servo loop;
    (b) for setting a loop gain value of the tracking servo loop;
    (c) sensing an amplitude of an envelope of an RF signal read out from said disc; and
    (d) determining the appropriateness of said value settings of the loop gains by comparing at least one of said set values of loop gain with a sensed value of the amplitude obtained in step (c) to determine if said loop gain is within a predetermined range of said sensed amplitude.

5. The loop gain setting method of claim 4, further comprising the step of: setting again at least one of said values of loop gain if a result of the determination in step (d) indicates that said loop gain is outside said predetermined range of said sensed amplitude.

6. The loop gain setting method of claim 4, further comprising the steps of: replacing at least one of said set values of loop gain by an initial setting value, if a result of the determination in step (d) indicates that said loop gain is outside said predetermined range of said sensed amplitude.

* * * * *

UNITED STATES PATENT AND TRADEMARK OFFICE
CERTIFICATE OF CORRECTION

PATENT NO. : 5,084,849
DATED : January 28, 1992
INVENTOR(S) : Ishii et al.

It is certified that error appears in the above-identified patent and that said Letters Patent is hereby corrected as shown below:

Column 12, line 20, after "said", insert --set--.

Column 12, line 25, delete "steps" and insert --step--.

Signed and Sealed this

Twenty-seventh Day of April, 1993

Attest:

MICHAEL K. KIRK

Attesting Officer

Acting Commissioner of Patents and Trademarks